US011343088B1

(12) United States Patent
Soh et al.

(10) Patent No.: US 11,343,088 B1
(45) Date of Patent: May 24, 2022

(54) SYSTEMS AND METHODS FOR QUANTUM OPTICAL DEVICE AUTHENTICATION

(71) Applicant: National Technology & Engineering Solutions of Sandia, LLC, Albuquerque, NM (US)

(72) Inventors: Daniel Beom Soo Soh, Pleasanton, CA (US); Scott E. Bisson, Livermore, CA (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 428 days.

(21) Appl. No.: 16/590,003

(22) Filed: Oct. 1, 2019

(51) Int. Cl.
| | |
|---|---|
| *H04B 10/00* | (2013.01) |
| *H04L 9/08* | (2006.01) |
| *G06F 7/58* | (2006.01) |
| *H04B 10/70* | (2013.01) |
| *H04B 10/50* | (2013.01) |
| *H04B 10/61* | (2013.01) |
| *G06N 10/00* | (2022.01) |
| *H04J 14/00* | (2006.01) |

(52) U.S. Cl.
CPC ............ *H04L 9/0858* (2013.01); *G06F 7/588* (2013.01); *G06N 10/00* (2019.01); *H04B 10/503* (2013.01); *H04B 10/61* (2013.01); *H04B 10/70* (2013.01)

(58) Field of Classification Search
CPC ................................ H04B 10/70; H04B 10/85
See application file for complete search history.

(56) References Cited

U.S. PATENT DOCUMENTS

| | | | |
|---|---|---|---|
| 8,374,350 B2 | 2/2013 | Yuan et al. | |
| 9,184,912 B2 | 11/2015 | Harrington | |
| 9,887,976 B2 | 2/2018 | Hughes et al. | |
| 2005/0157875 A1* | 7/2005 | Nishioka | H04B 10/70 380/46 |
| 2009/0106553 A1 | 4/2009 | Wang | |
| 2013/0016835 A1* | 1/2013 | Zbinden | H04L 9/0852 380/255 |
| 2014/0068765 A1 | 3/2014 | Choi et al. | |
| 2019/0123896 A1 | 4/2019 | Hong et al. | |

* cited by examiner

*Primary Examiner* — Daniel G Dobson
(74) *Attorney, Agent, or Firm* — Medley, Behrens & Lewis, LLC; Madelynne J. Farber

(57) ABSTRACT

Quantum optical device authentication technologies are described herein. A first device includes an optical transmitter transmits a plurality of pulses to an optical receiver included on a second device. The optical pulses each have one of two non-orthogonal optical states. The optical receiver measures each of the pulses and the second device records a measured value of the optical state of each pulse. Subsequently, the second device transmits the measured values of the optical states of the pulses to the first device. The first device outputs an indication of whether the second device is authenticated based upon the measured values received from the second device and the optical states of the pulses transmitted by the optical transmitter.

20 Claims, 8 Drawing Sheets

FIG. 2

|            | 1  | 2   | 3   | 4  | 5  | 6   | 7  | 8   | 9  |
|------------|----|-----|-----|----|----|-----|----|-----|----|
| ALICE (TX) | 0  | 0   | 45  | 45 | 0  | 45  | 0  | 45  | 45 |
| EVE (RX)   | 20 | 110 | 110 | 20 | 20 | 110 | 20 | 110 | 20 |
| EVE (TX)   | 20 | 110 | 110 | 20 | 20 | 110 | 20 | 110 | 20 |
| BOB (RX)   | 0  | 90  | 0   | 0  | 90 | 0   | 0  | 90  | 0  |

SYSTEMS AND METHODS FOR QUANTUM OPTICAL DEVICE AUTHENTICATION

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

As supply chains have grown larger and more complex, establishing trust in components and devices of larger systems has become a greater concern in potentially sensitive applications (e.g., military, power grid, or manufacturing applications). In particular, the risk of obtaining a counterfeit device that purports to be a genuine device but that performs different and undesirable functionality have increased. Various methods have been developed to establish trust with a device. Among these are authentication systems that allow one device to authenticate another device or verify that the other device is a previously trusted device (e.g., by virtue of having established physical control of both devices at a prior point in time).

Conventional authentication systems generally use cryptographic techniques such as RSA and elliptic curve cryptography to exchange shared, secret information between two devices. The devices subsequently authenticate one another by verifying that the other device has the same shared, secret information such as a cryptographic key. Conventionally this secret information is initially exchanged between the devices in an enrollment phase wherein the two devices are both physically located in a same trusted facility for performing the enrollment (e.g., a manufacturing facility at which the devices are made). Subsequently, the devices exchange encrypted information over a potentially insecure communications channel. These systems generally rely on the difficulty of reverse-engineering a cryptographic function to ensure security of the secret information from potential eavesdroppers on the communications channel and from attackers who attempt to read the shared, secret information stored at one of the devices.

While these conventional systems may be sufficient to secure two devices from many practical attacks using existing conventional computing devices, increases in computing power over time continually degrade the security of conventional authentication systems that rely on the security of cryptographic functions. These conventional authentication systems are also known to be even more vulnerable to attacks from quantum computers. Furthermore, the cryptographic operations performed by these systems require complex computations, thereby reducing battery life and requiring battery replacements that can further compromise the security of the devices to be authenticated.

Still further, in order to mitigate the risk that an attacker may have compromised the secret information, two devices can periodically exchange new secret information that is subsequently used as the basis for authentication between the two devices. Conventionally, such periodic exchange must occur in a secure facility to ensure the secrecy of the new information between the two devices from potential eavesdroppers. The need to return devices to a secure, trusted facility for re-enrollment is burdensome and precludes the possibility of keeping a secure device pair separated for an extended period.

SUMMARY

The following is a brief summary of subject matter that is described in greater detail herein. This summary is not intended to be limiting as to the scope of the claims.

Various technologies relating to secure authentication of devices based on principles of quantum mechanics are described herein. Technologies described herein are particularly suited to mutual authentication of device pairs, wherein a first device determines whether a second device is a trusted device and/or vice versa. By way of example, a device pair can include a first communications device and a second communications device that are employed to exchange confidential financial information in connection with facilitating a financial transaction. In another example, a device pair can include a weapon (e.g., a missile) and a weapons platform (e.g., an aircraft on which the missile is mounted). The technologies described herein allow the aforementioned devices to authenticate their respective paired devices prior to performing further operations with respect to the paired device. Continuing the first example above, the first communications device can authenticate that the second communications device is a trusted receiver for confidential financial information prior to transmitting such information. Continuing the second example, the weapon can authenticate that the weapons platform is an authorized platform for the weapon prior to allowing the weapons platform to fire the weapon.

In an exemplary embodiment, a first device includes an optical transmitter and a second device includes an optical receiver. The optical transmitter is coupled to the optical receiver by way of an optical channel, such as a fiber-optic cable. The first device and the second device can be configured to authenticate one another by way of a two step process that includes an enrollment phase and an authentication phase. In an enrollment phase, the optical transmitter transmits a plurality of optical pulses to the optical receiver, wherein each of the pulses has one or the other of two non-orthogonal optical states. The optical states can be, for example, non-orthogonal polarization states (e.g., 0 degrees and 45 degrees with respect to a common reference polarization) or non-orthogonal coherent states defined by P-Q quadrature values. The first device further comprises a hardware logic device or a computing device that is operably coupled to the optical transmitter and that maintains a record of the value of the optical state of each of the plurality of pulses transmitted to the receiver. The optical receiver measures a value of the optical state of each of a plurality of pulses that it receives by way of the optical channel. The second device further comprises a hardware logic device or a computing device that is operably coupled to the optical receiver and that maintains a record of the measured values of the optical states of the pulses.

Subsequently, in an authentication phase, either of the first device or the second device can authenticate the other device based upon their respectively maintained records of values. In an example, the first device transmits a request to a device that is desirably authenticated, referred to as a device under test (DUT). It may be unknown whether the DUT is the second device previously enrolled with the first device or if the DUT is a third device. The first device transmits a request for authentication data from the DUT. The DUT receives the request and transmits authentication data to the first device. The first device receives the authentication data and compares values in the authentication data to the record of transmitted values that is maintained at the first device. The first device determines whether the values received from the DUT are consistent with the values transmitted by the first device.

Since the two optical states of the pulses transmitted by the transmitter are non-orthogonal, the optical states cannot be completely discriminated from one another by a measurement device. Thus, in general a receiver cannot reliably determine with complete certainty which of the two optical states was transmitted by the transmitter for every pulse in the plurality of pulses. However, the transmitter and the receiver can be initially aligned to a common secret reference optical state (e.g., at a secure, trusted facility) such that the receiver is able to reliably measure the common reference optical state. For instance, the transmitter and the receiver can be aligned to a common reference polarization such that when the transmitter transmits the reference polarization state (e.g., zero degrees polarization), the receiver always measures the reference polarization state correctly (e.g., as being the zero degrees polarization state).

While the receiver is co-aligned with the transmitter, an eavesdropper on the optical channel does not know the reference optical state and is therefore misaligned with respect to the reference optical state. When the eavesdropper is present on the optical channel and measures optical states of pulses received from the transmitter, measurement errors will result from the misalignment of the reference state between the transmitter and the eavesdropper. Therefore, when the eavesdropper measures a pulse received from the transmitter, the eavesdropper measures one of two optical states with respective probabilities that are determined by the amount of misalignment between a reference state employed by the eavesdropper and the common secret reference state shared by the transmitter and the receiver. Thus, whereas the receiver is able to reliably distinguish the reference optical state due to alignment of the transmitter and the receiver, the eavesdropper cannot reliably distinguish either of the optical states. Hence, when the eavesdropper measures a pulse having either the common reference state shared by the transmitter and the receiver or the non-orthogonal optical state, the eavesdropper will sometimes measure the received state as being one optical state and sometimes measure the common reference state as being another optical state. The eavesdropper is therefore unable to determine which of two optical states were transmitted by the transmitter based on measurements made by the eavesdropper.

Accordingly, when the eavesdropper transmits new spoof pulses to the receiver included on the second device (e.g., so that the receiver does not fail to receive an expected pulse), even if the eavesdropper transmits the pulses with the optical states she has measured, the eavesdropper will at least sometimes transmit a pulse having an optical state that is different from the value originally transmitted by the transmitter. Therefore, when the receiver measures pulses received on the optical channel from the eavesdropper, the receiver can measure values that could not have been measured by the receiver if the receiver had received the pulses directly from the transmitter. When the first device compares the values that it receives from the second device (i.e., the measured values of the optical states of the pulses received by the receiver), the first device can detect inconsistencies between the values of the pulses transmitted by the transmitter and the values of the pulses received by the receiver. Responsive to detecting an inconsistency, the first device can output an indication that the second device is unauthorized.

In various embodiments, either or both of the first device and the second device can be configured to exchange authentication data prior to completing the enrollment phase. The first device and the second device can confirm that no inconsistencies are present between the values transmitted by the optical transmitter and the values received by the optical receiver. Responsive to confirming that no inconsistencies are present in the authentication data, the enrollment phase is completed, and the authentication data can subsequently be used in an authentication phase by either of the first device or the second device to authenticate the other device. In another example, responsive to confirming that no inconsistencies are present in the authentication data, the enrollment phase can be repeated to generate second authentication data. The second authentication data can subsequently be used in the authentication phase by either of the first device or the second device to authenticate the other device.

The authentication technologies described herein present several advantages over conventional authentication systems. First, an authentication system described herein can be configured to securely enroll devices in a security scheme remotely such that devices need not be in the possession of a same entity at a same secure physical location in order to perform enrollment. Therefore, in an authentication system described herein, devices can be re-enrolled frequently in the field without incurring the burden of gathering the devices together again at the same secure location. Therefore, systems and methods described herein are well-suited to mitigating the possibility of secret information being accessed from a device by an attacker and being used to improperly authenticate with a paired device.

Further, an authentication system described herein is not susceptible to brute force computational attacks designed to compromise the security of a cryptographic function, whether by conventional or quantum computers. Still further, in an authentication phase subsequent to an enrollment phase, only relatively simple computations such as bit comparison operations need be performed by devices that are authenticating one another. As compared with systems relying on conventional cryptographic techniques, authentication devices described herein consume less energy in connection with performing authentication. Authentication systems described herein therefore allow for the use of smaller batteries in authentication devices or obviate the need for battery replacement over the lifetime of a device. Devices that do not need to have batteries replaced can be constructed to be more physically secure (e.g., with no portions of the device being removable) than devices that require batteries to be changed or charged.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 2 is a table of exemplary optical state values in a quantum optical authentication system.

DETAILED DESCRIPTION

Figure 1:
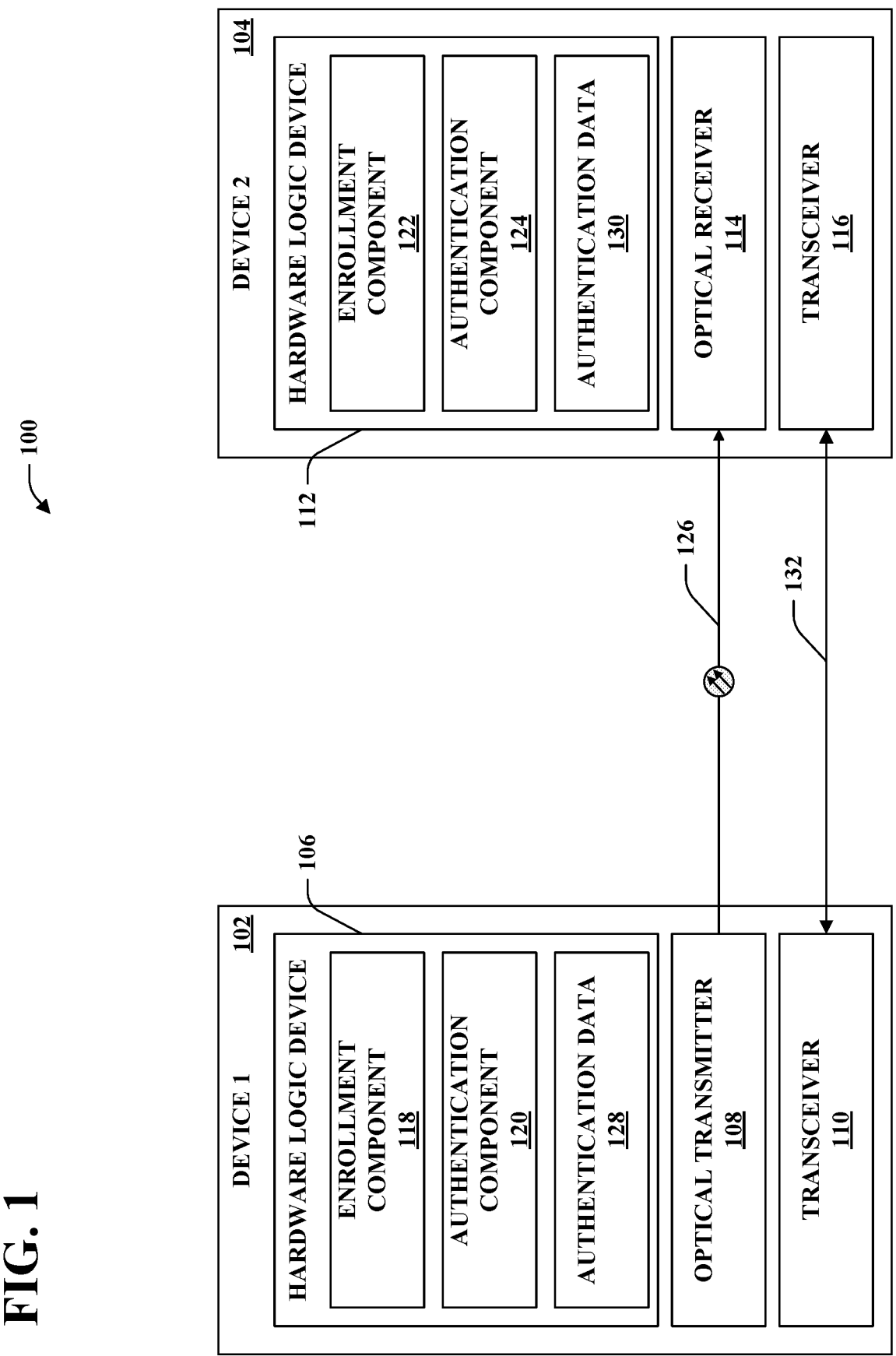
FIG. 1 is a functional block diagram of an exemplary system that facilitates quantum optical authentication of a device pair.

Various technologies pertaining to mutual authentication of devices based upon quantum mechanical principles are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something and is not intended to indicate a preference.

With reference to FIG. 1, an exemplary system 100 that facilitates mutual authentication of a first device 102 and a second device 104 is illustrated. Stated differently, the system 100 is configured to allow the first device 102 to verify that the second device 104 is a device that has been previously established as being a trusted device, and vice versa. As will be described in greater detail below, the system 100 makes use of principles of quantum mechanics to facilitate the exchange of shared secret data between the devices 102, 104 that can be subsequently used by the devices 102, 104 to authenticate one another.

The system 100 includes the first device 102 and the second device 104. The devices 102, 104 can be substantially any devices that are desirably authenticated with one another. For example, the devices 102, 104 can respectively be a weapon and a weapons platform. In another example, the devices 102, 104 can be communications devices that are desirably used to exchange sensitive or confidential information. The devices 102, 104 can be configured such that various functionality of the devices 102, 104 is enabled by at least one of the devices 102, 104 authenticating the other (or disabled by the failure of the devices 102, 104 to authenticate one another).

The first device 102 comprises a hardware logic device 106, an optical transmitter 108, and a transceiver 110. Similarly, the second device 104 comprises a hardware logic device 112, an optical receiver 114, and a transceiver 116. The hardware logic device 106 is generally configured to control operation of the optical transmitter 108 and the transceiver 110 of the first device 102 in connection with authentication of the second device 104 by the first device 102 or vice versa. The hardware logic device 112 of the second device 104 is generally configured to control operation of the optical receiver 114 and the transceiver 116 in connection with authentication of the first device 102 by the second device 104 or vice versa, as described in greater detail below. The hardware logic devices 106, 112 can be embodied by any of various hardware logic components including, but not limited to, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Operations of the system 100 in connection with authentication of the second device 104 by the first device 102 are now set forth. The hardware logic device 102 comprises an enrollment component 118 and an authentication component 120. The hardware logic device 112 also comprises an enrollment component 122 and an authentication component 124. In exemplary embodiments, the enrollment components 118, 122 and the authentication components 120, 124 can be componentry configured to perform functionality described herein with respect to such components based upon configuration data used to configure the hardware logic devices 106, 112 (e.g., in embodiments wherein the hardware logic devices 106, 112 are FPGAs).

The enrollment components 118, 122 are configured to collectively perform enrollment of each of the devices 102, 104 in a mutual authentication scheme. With more particularity, the enrollment components 118, 122 control operations of the optical transmitter 108 and the optical receiver 114, respectively, to exchange authentication data between the first device 102 and the second device 104, which authentication data can subsequently be used by the authentication components 120, 124 to authenticate either of the devices 102, 104. Actions performed by the enrollment components 118, 122 are described herein as occurring during an "enrollment phase." Prior to an enrollment phase, the devices 102, 104 can be jointly configured such that the optical transmitter 108 and the optical receiver 114 share a common, secret reference optical state. In exemplary embodiments, the joint configuration of the devices 102, 104 to share the common reference optical state occurs in a same secure facility that is trusted to be secure from eavesdroppers and other attackers. During an enrollment phase, the devices 102, 104 are connected by an optical channel 126 such that the optical transmitter 108 is in optical communication with the optical receiver 114. During the enrollment phase, the devices 102, 104 may be under the physical control of a same entity or may be under the physical control of different entities. For example, the devices 102, 104 can be collocated in a same facility during the enrollment phase, or the devices 102, 104 can be located at separate locations, provided the devices 102, 104 are in communication by way of the optical channel 126.

In an exemplary embodiment, the enrollment component 118 of the first device 102 causes the optical transmitter 108 to transmit a plurality of pulses to the optical receiver 114 by way of the optical channel 126. The optical transmitter 108 is configured to transmit the pulses such that each of the pulses has one of two non-orthogonal optical states. By way of example, and not limitation, the optical transmitter 108 can be configured to transmit the pulses such that each pulse has one or the other of a first polarization state or a second polarization state that is non-orthogonal to the first polarization state (e.g., 0 degrees with respect to a reference polarization for the first polarization state and 45 degrees with respect to the reference polarization for the second polarization state). In another non-limiting example, the optical transmitter 108 can be configured to transmit the pulses such that each pulse has one or the other of a first coherent state or a second coherent state that is non-orthogonal to the first coherent state (i.e., such that the inner product between the first coherent state and the second coherent state is non-zero).

Due to the non-orthogonal nature of the two optical states and as a result of the quantum uncertainty principle, neither the optical receiver 114 nor an eavesdropper on the optical channel 126 can perfectly measure both of the optical states simultaneously. However, due to the common shared reference optical state between the optical transmitter 108 and the optical receiver 114, the optical receiver 114 can be configured to reliably measure one of the optical states. For example, if the optical transmitter 108 transmits pulses having either a first polarization of zero degrees or a second polarization of 45 degrees with respect to the common reference, the optical receiver 114 can be configured either to consistently identify the first polarization state of zero degrees or the second polarization state of 45 degrees, but cannot consistently accurately measure both of the polarization states simultaneously. Continuing the example, the optical receiver 114 can include a 0/90 degree polarizer that can separate light into light having a 0 degree polarization and light having a 90 degree polarization. When the polarizer receives a pulse having a 0 degree polarization, the polarizer consistently directs the pulse along a first path corresponding to 0 degrees polarization (whereupon the pulse can be detected by a detector, as described in greater detail below). When the polarizer receives a pulse having a 45 degree polarization, the polarizer directs the pulse along the first path with a 50% probability and directs the pulse along a second path corresponding to 90 degrees polarization with a 50% probability. Therefore, in this example, the optical receiver 114 can measure 0 degree polarization when the optical transmitter 108 transmits either a pulse having 0 degree polarization or a pulse having 45 degree polarization. However, in the example, the optical receiver 114 only measures 90 degree polarization when the optical transmitter 108 transmits a pulse having 45 degree polarization.

By contrast, an eavesdropper on the optical channel 126, referred to as Eve according to convention, is generally unable to reliably distinguish either of the non-orthogonal optical states due to misalignment between a reference optical state used by Eve and the common (secret) reference optical state employed by the optical transmitter 108 and the optical receiver 114. For example, an optical receiver employed by Eve can be misaligned from a reference polarization employed by the optical transmitter 108 and the optical receiver 114 by some offset angle. When Eve receives a pulse having a polarization of 0 degrees with respect to the common reference of the transmitter 108 and the receiver 114, Eve will measure the polarization state of the pulse as being 0 degrees with respect to her own reference with a first probability and will measure the polarization state of the pulse as being 90 degrees with respect to her own reference with a second probability. Values of the first and second probability depend on the magnitude of the offset angle with respect to the common reference. Similarly, Eve measures the second non-orthogonal optical state transmitted by the transmitter 108 as being 0 degrees with respect to her own reference with a third probability and as being 90 degrees with respect to her own reference with a fourth probability. Therefore, upon receipt of a pulse from the transmitter 108, Eve cannot be certain which of two non-orthogonal optical states was actually transmitted by the transmitter 108.

Referring now to FIG. 2, a table 200 of exemplary polarization states in the system 100 is shown, illustrating the effect of Eve's uncertainty on communications occurring over the optical channel 126 when Eve attempts to defeat the authentication. It is to be understood that while the table 200 depicts values for polarization states, the same principles apply to other optical states such as coherent states or optical quadrature values. The table 200 includes a first row that includes pulse index values for nine different pulses. The table 200 includes a second row indicating a polarization state transmitted by the transmitter 108, referred to as Alice according to convention, for each of the nine pulses. The table 200 further includes a third row indicating an optical state measured by Eve for each of the nine pulses transmitted by Alice. The table 200 further includes a fourth row indicating an optical state transmitted by Eve for each of the nine pulses in an attempt to replicate each of the nine pulses measured by Eve. Lastly, the table 200 includes a fifth row indicating an optical state measured by the receiver 114, referred to as Bob by convention, for each of the nine pulses transmitted by Eve. It is to be understood that the polarization states depicted in table 200 are with respect to a common reference polarization shared by Alice and Bob.

As noted above, due to the non-orthogonal nature of the two polarization states transmitted by Alice, a receiver cannot perfectly distinguish both of the polarization states simultaneously. In the exemplary table 200, Alice transmits pulses to have a polarization state of either 0 degrees or 45 degrees. In an example, either or both of Eve and Bob can receive such pulses using a polarizer configured to distinguish between polarization states of 0 degrees and 90 degrees. In such example, Bob can consistently distinguish the 0 degree polarization state since Bob shares the common reference polarization with Alice. Stated differently, when Bob receives a pulse having a 0 degree polarization state, Bob consistently measures the pulse as having the 0 degree polarization state. However, when Bob receives a pulse having a 45 degree polarization state, Bob will measure the polarization state as being 0 degrees 50% of the time and 90 degrees 50% of the time.

As noted above, due to misalignment between Eve's reference and the common reference shared by Alice and Bob, Eve is unable to reliably distinguish either of the optical states transmitted by Alice. Therefore, due to the misalignment of reference frames, regardless of which optical state Eve measures, Eve cannot be certain which optical state was actually transmitted by Alice.

The effects of such uncertainty on values received by each of Eve and Bob in an enrollment phase are depicted in table 200. For the exemplary communications depicted in table 200, Eve's reference is offset from the common reference shared by Alice and Bob by 20 degrees. Thus, 0 degrees in the common reference shared by Alice and Bob is 20 degrees according to Eve's reference. Likewise, 90 degrees according to the common reference shared by Alice and Bob is 110 degrees in Eve's reference. For a first pulse, Alice transmits a polarization state of 0 degrees in the common reference frame shared by Alice and Bob. Eve receives the first pulse and measures the polarization as 0 degrees in her own reference frame, which is 20 degrees in the common reference frame. However, because Eve can sometimes measure 0 degrees in her own reference frame both when Alice transmits a polarization state of 0 degrees in the common reference frame and when Alice transmits a polarization state of 45 degrees in the common reference frame, Eve cannot be certain which of the two polarization states Alice transmitted at pulse 1. Eve must therefore make a guess as to which value was transmitted by Alice and choose a polarization state to transmit to Bob (e.g., so that Bob is not alerted to Eve's presence by failure to receive a pulse). Since Eve does not have knowledge about the offset between her own reference and the common reference frame, she is generally unable to do better than simply transmitting the polarization state she has measured. Therefore, at pulse 1, Eve selects the polarization state of 0 degrees in her own reference frame and transmits a pulse having the selected polarization state to Bob.

Bob receives the pulse, which has a polarization state of 20 degrees in the common reference frame due to the misalignment between Eve's reference and the common reference. Since Bob's measurement apparatus is only able to distinguish between orthogonal optical states, Bob measures the 20 degrees pulse transmitted by Eve as being 0 degrees or 90 degrees according to probabilities determined by the offset angle. For pulse 1, Bob measures the polarization state of the pulse as being 0 degrees. Since Bob reliably measures 0 degrees polarization when Alice transmits 0 degrees polarization, Alice and Bob are unable to detect the presence of Eve based upon pulse 1.

For the second pulse, Alice transmits 0 degrees again. This time, Eve measures the 0 degrees pulse as being 90 degrees in her own reference frame, or 110 degrees in the common reference frame. Eve transmits a pulse having 90 degrees in her own reference frame to Bob, which in the common reference frame used by Bob is 110 degrees. Since the state of 110 degrees is non-orthogonal to measurement bases of 0 degrees and 90 degrees employed by Bob, Bob will measure the 110 degrees pulse as being either 0 degrees or 90 degrees according to respective probabilities. In the case of pulse 2, Bob measures the 110 degrees pulse transmitted by Eve as 90 degrees. However, if Bob had received the pulse transmitted by Alice, which has the 0 degrees polarization state, Bob could not have measured 90 degrees as the polarization state of the second pulse because Bob is always able to distinguish the state of 0 degrees with respect to the common reference. When comparing the value transmitted by Alice and the value measured by Bob at pulse 2, Alice and Bob can detect the inconsistency between the polarization state of the pulse transmitted by Alice and the polarization state measured by Bob. The inconsistency indicates the presence of an eavesdropper (Eve) on the channel used to the transmit the pulses. A similar inconsistency occurs at pulse 5, except that in this instance Bob measures the 20 degrees state transmitted by Eve as being 90 degrees rather than 0 degrees at pulse 1.

Referring once again to FIG. 1, during the enrollment phase, the enrollment component 118 generates first authentication data 128 that comprises optical states of pulses transmitted by the transmitter 108. Also, during the enrollment phase, the optical receiver 114 receives a plurality of pulses by way of the optical channel 126. The enrollment component 122 can generate second authentication data 130 based upon signals output by the optical receiver 114 responsive to the receiver 114 receiving the pulses from the optical channel 126. The second authentication data 130 comprises measured optical states of pulses received by the optical receiver 114.

Due to the potential presence of an eavesdropper on the channel 126 (e.g., when the devices 102, 104 are not collocated at a same secure facility during the enrollment phase), the optical receiver 114 may be uncertain as to whether the values in the second authentication data 130 are representative of pulses transmitted by the optical transmitter 108 or are instead representative of pulses transmitted by an eavesdropper. Accordingly, the enrollment component 122 can transmit the second authentication data 130 to the first device 102 prior to completion of the enrollment phase. In an exemplary embodiment, the enrollment component 122 transmits the second authentication data 130 to the first device 102 by way of the transceiver 116. In other embodiments, the enrollment component 122 transmits the second authentication data 130 to the first device 102 by way of the optical channel 126 to maintain security of the second authentication data 130. Since eavesdroppers are able to be detected on the optical channel 126, it may be desirable to limit exchange of data between the first device 102 and the second device 104 to the optical channel 126 rather than risk exposure of the authentication data 130 or the authentication data 128 on the classical channel 132.

Responsive to receipt of the authentication data 130 (e.g., by way of the transceiver 110), the first device 102 compares the measured values of the optical states of the pulses indicated in the authentication data 130 to the known values of the optical states actually transmitted and that are indicated in the authentication data 128. In exemplary embodiments, each of the authentication data 128 and the authentication data 130 can represent the optical states with bit values such that the first optical state transmitted by the transmitter 108 is represented by a bit value of "0" and the second optical state transmitted by the transmitter 108 is represented by a bit value of "1". In such embodiments, a number of bit values included in the authentication data 128 and the authentication data 130 may be equal to the number of pulses transmitted and the number of pulses received, respectively. Evaluation of whether the authentication data 130 is consistent with the authentication data 128 (i.e., whether the coherent states indicated in the authentication data 130 are quantum mechanically possible measured values of the coherent states indicated in the authentication data 128) can be performed using relatively simple bit comparison operations. For example, if a bit value for a pulse in the authentication data 128 is "0" it may be that the only quantum mechanically valid value for that same pulse in the authentication data 130 is also "0". In another example, if a bit value for a pulse in the authentication data 128 is "1" it may be that either "0" or "1" is a valid value for that pulse in the authentication data 130.

If the authentication data 130 is confirmed by the hardware logic device 106 as valid, the enrollment phase can be considered completed. The authentication data 128, 130 can subsequently be used to authenticate either of the devices 102, 104 with the other in an authentication phase, as described in greater detail below. In embodiments wherein the authentication data 130 is confirmed by way of transmission over the classical channel 132, the enrollment component 118 can be configured to cause the optical transmitter 108 to transmit an additional plurality of pulses to the second device 104. The additional plurality of pulses are measured to generate new authentication data 130 that is subsequently used in an authentication phase. Thus, the initial pulses exchanged by the devices 102, 104 are used to confirm that no eavesdropper is present on the optical channel 126 and the additional pulses are used to generate the authentication data 128, 130 used to mutually authenticate the devices 102, 104 in the authentication phase. Using the additional pulses to generate new authentication data 130 avoids the potential for compromise of the security of the authentication data 128, 130 by virtue of transmission on the potentially unsecure classical channel 132.

It is to be understood that while the optical transmitter 108 is described herein as transmitting pulses each having one of two non-orthogonal optical states during an enrollment phase, the transmitter 108 can be configured to transmit pulses that can each have one of more than two different optical states during the enrollment phase. For instance, the optical transmitter 108 can be configured to randomly select for transmission an optical state that is non-orthogonal to a reference optical state, wherein the receiver 114 is configured to be able to reliably distinguish the reference optical state. By way of an example, during an enrollment phase the optical transmitter 108 could transmit pulses having polarization states of 0 degrees, 45 degrees, 65 degrees, and 25 degrees, wherein each of 45 degrees, 65 degrees, and 25 degrees is non-orthogonal to the reference state of 0 degrees.

After completion of the enrollment phase, authentication of the devices 102, 104 can be performed by the authentication components 120, 124. The authentication component 120 can authenticate the second device 104 based upon the authentication data 128 stored at the first device 102 and the authentication data 130 stored at the second device 104. The authentication component 124 can similarly authenticate the first device 102 based upon the authentication data 128 and the authentication data 130. It is to be understood, therefore, that either of the devices 102, 104 can authenticate the other of the devices 102, 104 based upon the authentication data 128, 130.

As indicated above with respect to the enrollment phase, the authentication component 120 authenticates the second device 104 by transmitting a request for the authentication data 130 to the second device 104 (e.g., by way of the classical channel 132). Responsive to receiving the request at the second device 104, the authentication component 124 transmits the authentication data 130 to the first device 102. The authentication component 120 then compares the authentication data 130 to the authentication data 128 on a pulse-to-pulse basis to determine whether the authentication data 130 represents quantum mechanically valid values. For example, the authentication component 120 compares a first value in the authentication data 130 to a first value in the authentication data 128, wherein the first values are representative of a received value of a first pulse and a transmitted value of the first pulse. The authentication component 120 compares a second value in the authentication data 130 to a second value in the authentication data 128, wherein the second values are representative of a received value of a second pulse and a transmitted value of the second pulse. The authentication component 120 compares corresponding values for each of a plurality of n pulses represented in the authentication data 128, 130. Responsive to determining that each of the values of the authentication data 130 is a quantum mechanically valid value with respect to its corresponding value in the authentication data 128, the authentication component 120 outputs an indication that the second device 104 is authorized. Responsive to determining that any of the values in the authentication data 130 is not a quantum mechanically valid value, the authentication component 120 outputs an indication that the second device 104 is not authorized.

In exemplary embodiments, the devices 102, 104 can be configured to re-enroll one another in the authentication scheme subsequent to an initial enrollment phase performed by the devices 102, 104. The devices 102, 104 can be configured to perform the enrollment phase one or more additional times to generate new authentication data 128, 130 periodically, at random intervals, or responsive to any of various stimuli. By way of example, and not limitation, the devices 102, 104 can be configured to perform the enrollment phase responsive to receipt of user input requesting re-enrollment of the devices 102, 104. Re-enrollment of the devices 102, 104 to generate new authentication data 128, 130 can mitigate the potential for an attacker to gain access to the authentication data 128 or 130 (e.g., by gaining physical control over one of the devices 102, 104) and subsequently use such data to acquire false authorization from the devices 102, 104. Since the devices 102, 104 can re-enroll one another in the authentication scheme (e.g., by generating new authentication data 128, 130) in a secure manner without requiring the devices 102, 104 to be brought together again at a secure facility, the devices 102, 104 can be more securely kept in their respective operational environments for longer periods of time than possible with conventional cryptographic authentication schemes.

In order to mitigate the possibility that an attacker will discover or be able to determine the alignment of common reference optical state between the transmitter 108 and the receiver 114, the devices 102, 104 can be configured to shift their common reference state prior to performing the enrollment phase. By way of example, and not limitation, the first device 102 can transmit a shift value to the second device 104 (e.g., by way of the optical channel 126 or the classical channel 132) that indicates an amount by which to shift the common reference optical state prior to performing the enrollment phase. Subsequently, the first device 102 adjusts the optical transmitter 108 to transmit pulses based upon the shifted common reference optical state, and the second device 104 adjusts the optical receiver 114 to receive and measure pulses based upon the shifted common reference optical state. In further embodiments, the first device 102 and the second device 104 can be configured to jointly shift their common reference optical state by a same amount during an enrollment phase.

While the system 100 is shown and described as including an optical channel 126 and a classical channel 132, it is to be understood that communications that are described as occurring over the classical channel 132 could instead be transmitted by way of the optical channel 126.

Various exemplary embodiments of the optical transmitter 108 and the optical receiver 114 are now described. It is to be understood that such embodiments are provided as examples and are not intended to be limiting as to the scope of the present disclosure. Other embodiments of both the optical transmitter 108 and the optical receiver 114 are contemplated.

Figure 3:
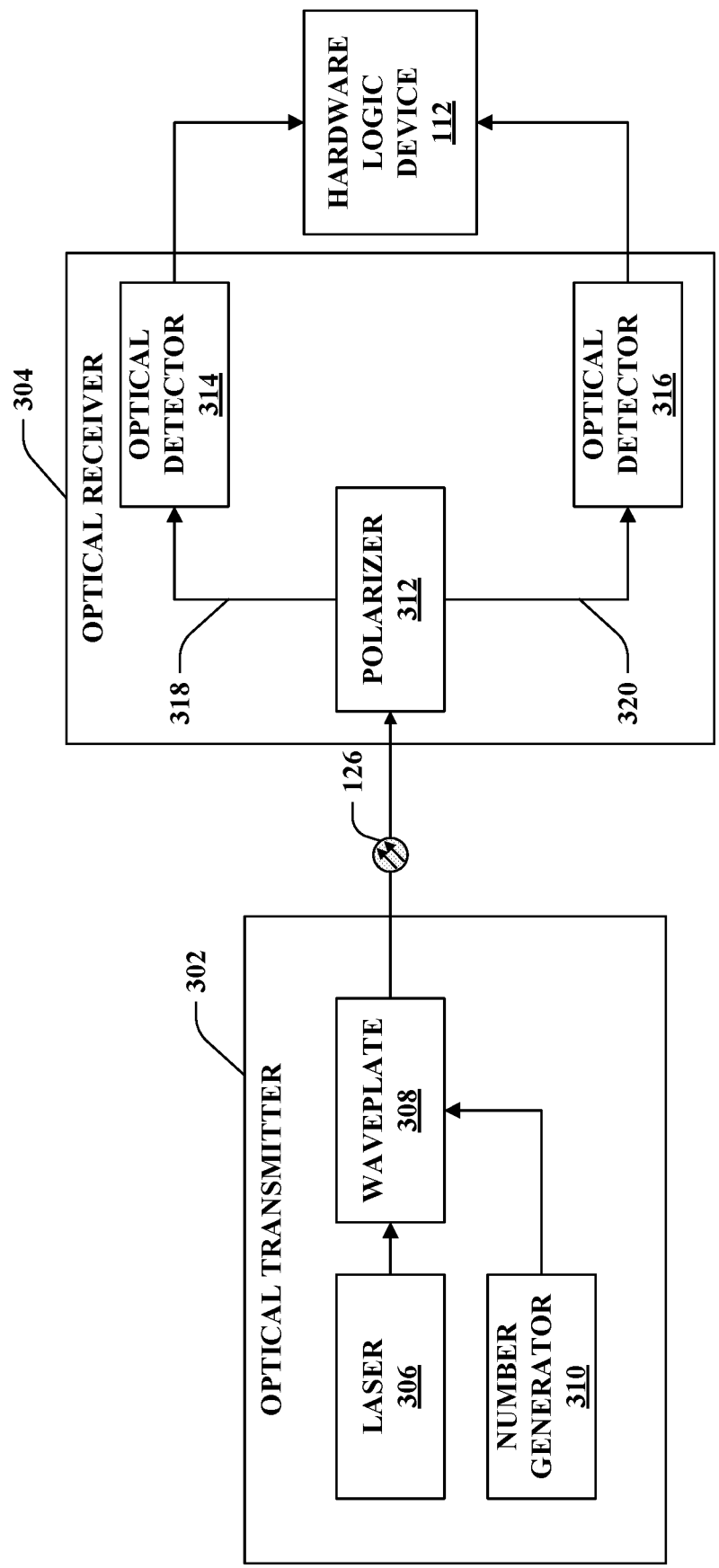
FIG. 3 is a functional block diagram of an exemplary polarization-state optical transmitter and an exemplary optical receiver.

Referring now to FIG. 3, an exemplary optical transmitter 302 and an exemplary optical receiver 304 that facilitate transmission and detection of pulses of light each having one of two non-orthogonal polarization states are illustrated. In an exemplary embodiment, the optical transmitter 108 can be or include the optical transmitter 302, and the optical receiver 114 can be or include the optical receiver 304. The optical transmitter 302 includes a laser 306, a waveplate 308, and a number generator 310. The laser 306 is configured to output pulses of light to the waveplate 308, whereupon the pulses are output from the waveplate 308 to the optical channel 126. The waveplate 308 is controllable to selectively impart different polarization states to different pulses received at the waveplate 308. The waveplate 308 is further configured to be controllable based upon output of the number generator 310. For example, the waveplate 308 can be controlled to impart a first polarization to a first pulse of light responsive to the number generator 310 outputting a first number. The waveplate 308 can further be controlled to impart a second polarization to a second pulse of light responsive to the number generator 310 outputting a second number. In exemplary embodiments, the number generator 310 can be a true random number generator (RNG) or a pseudo-RNG. While the number generator 310 is depicted in FIG. 3 as being coupled to the waveplate 308, it is to be understood that in various embodiments the number generator 310 can be coupled to or included in a hardware logic device (e.g., the hardware logic device 106) that is in turn configured to control operation of the waveplate 308 based upon output of the number generator 310.

The optical receiver 304 receives pulses that are transmitted by the optical transmitter 302 along the optical channel 126. The optical receiver 304 comprises a polarizer 312, and two optical detectors 314, 316. The first optical detector 314 is coupled to the polarizer 312 by way of a first optical path 318. The second optical detector 316 is coupled to the polarizer 312 by way of a second optical path 320. The detectors 314, 316 are each configured to output an electrical signal to the hardware logic device 112 responsive to receiving an optical pulse. Thus, when an optical pulse is received at the first detector 314, the first detector 314 outputs an electrical signal to the hardware logic device 112 that indicates that the first detector 314 received the optical pulse. Similarly, when an optical pulse is received at the second detector 316, the second detector 316 outputs an electrical signal to the hardware logic device 112 that indicates that the second detector 316 received the optical pulse.

When a pulse is received at the polarizer 312, the polarizer 312 directs the pulse along one or the other of the optical paths 318, 320 based upon the polarization state of the pulse (and thence to one of the detectors 314, 316). In an exemplary embodiment, the polarizer 312 can be a 0/90 degree polarizer. In the embodiment, responsive to receiving a pulse having a polarization state of 0 degrees, the polarizer 312 can direct the pulse along the first optical path 318 to the first detector 314. Responsive to receiving a pulse having a polarization state of other than 0 degrees or 90 degrees (e.g., 45 degrees), the polarizer 312 directs the pulse along either of the first optical path 318 or the second optical path 320. In such a case, the polarizer 312 directs the pulse along one or the other of the paths 318, 320 according to a probability distribution that is based on the polarization state of the pulse. The hardware logic device 112 generates a value that is indicative of a polarization of the pulse received by the optical receiver 304 based upon electrical signals received from the optical detectors 314, 316. In an example, the hardware logic device 112 generates a first value that is representative of a first polarization state based upon receiving an electrical signal from the first optical detector 314. Continuing the example, the hardware logic device 112 generates a second value that is representative of a second polarization state based upon receiving an electrical signal from the second optical detector 316.

Figure 4:
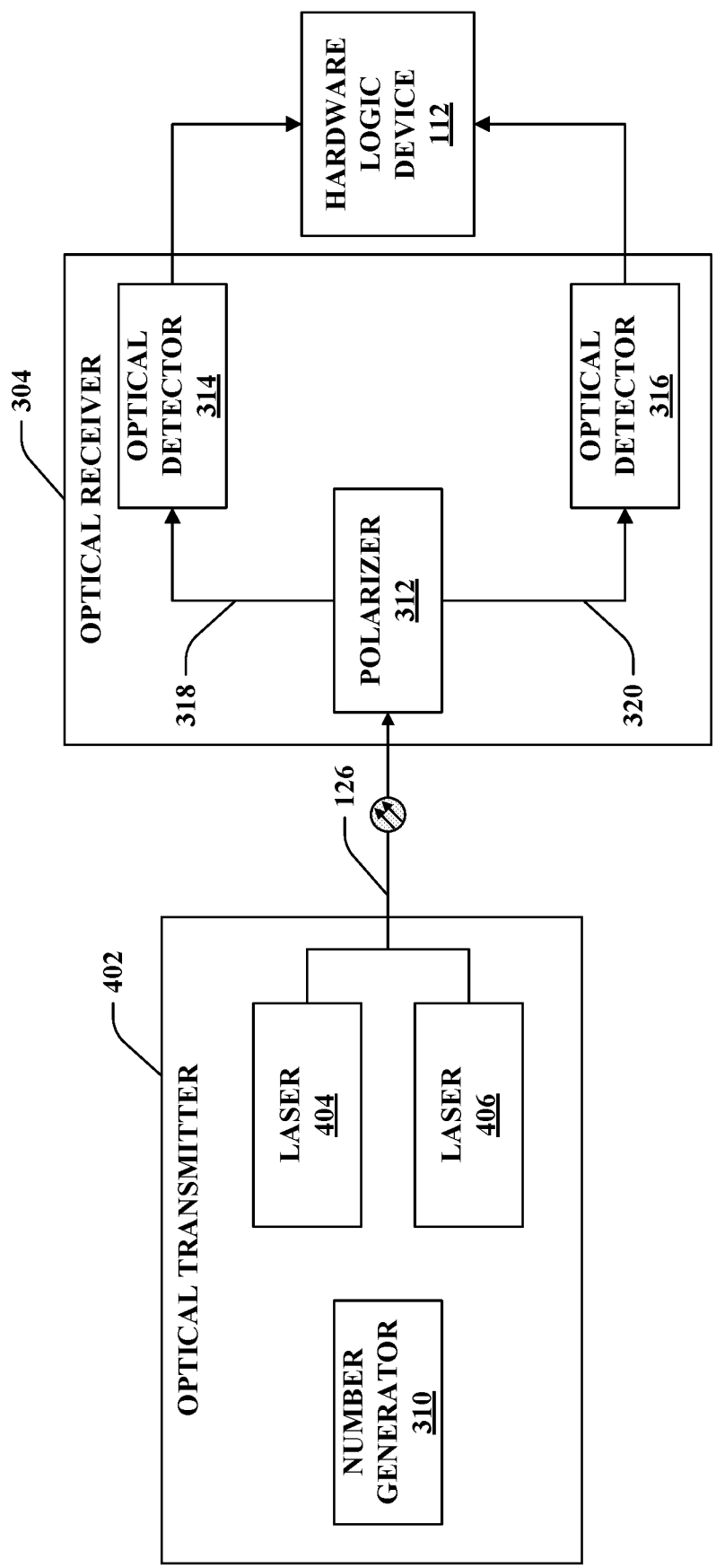
FIG. 4 is a functional block diagram of another exemplary polarization-state optical transmitter and an exemplary optical receiver.

Referring now to FIG. 4, another exemplary optical transmitter 402 configured to transmit pulses of light each having one of two non-orthogonal polarization states is illustrated. The optical transmitter 402 includes a first laser 404 and a second laser 406. The first laser 404 is configured to output light having a first polarization and the second laser 406 is configured to output light having a second polarization that is non-orthogonal to the first polarization. The optical transmitter 402 further includes the number generator 310. Rather than incorporating a movable waveplate to selectively impart a polarization to light output by a single laser, in the optical transmitter 402, the lasers 404, 406 can be individually selectively energized or individually selectively coupled to the optical channel 126 based upon output of the number generator 310. By way of example, the first laser 404 can be energized and/or coupled to the optical channel 126 based upon the number generator 310 outputting a first number. By way of further example, the second laser 406 can be energized and/or coupled to the optical channel 126 based upon the number generator 310 outputting a second number.

In connection with employing either of the optical transmitters 302, 402 and the optical receiver 304 in the quantum optical authentication system 100, the transmitter 302 or 402 can be jointly calibrated with the optical receiver 304 such that the transmitter 302 or 402 shares a same reference polarization. The joint calibration of the transmitter 302 or 402 with the receiver 304 can be performed prior to an enrollment phase being performed by the system 100. For example, the joint calibration of the transmitter 302 or 402 with the receiver 304 can be performed at a trusted, secure facility wherein it can be assured that a potential attacker is unable to observe the common reference polarization shared by the transmitter 302 or 402 and the receiver 304.

Figure 5:
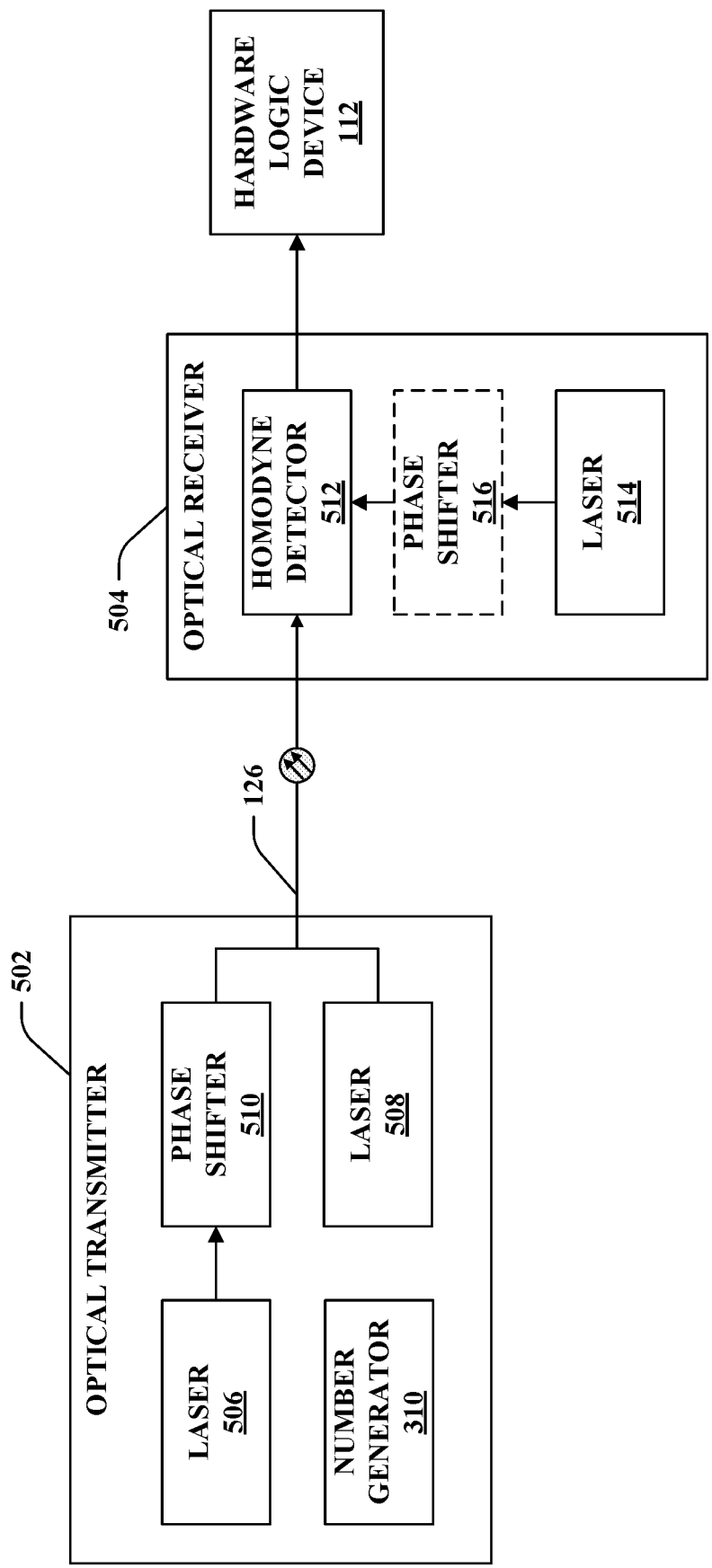
FIG. 5 is a functional block diagram of an exemplary coherent state optical transmitter and an exemplary coherent state optical receiver.

Referring now to FIG. 5, an exemplary optical transmitter 502 and an exemplary optical receiver 504 that are configured to respectively transmit and receive optical pulses each having one of two non-orthogonal coherent states are illustrated. The optical transmitter 502 comprises a first laser 506, a second laser 508, a phase shifter 510, and the number generator 310. The first laser 506 and the second laser 508 are configured to output light having a first coherent state and a second coherent state, respectively. In general, the coherent states output by the lasers 506, 508 can be selected by selecting a desired amplitude of light output by the lasers 506, 508 and shifting a phase of light output by one or both of the lasers 506, 508. Thus, for example, a coherent state output by the first laser 506 can be selected by controlling the amplitude of the light output by the first laser 506 and subsequently shifting the phase of the light output by the first laser 506 using the phase shifter 510. Prior to performance of an enrollment phase by a device including the optical transmitter 502 and a device including the optical receiver 504, the optical transmitter 502 and the optical receiver 504 can be configured to share a common reference phase value. By way of example, and not limitation, the transmitter 502 and the receiver 504 can be jointly configured such that respective local oscillators at the transmitter 502 and the receiver 504 have a same reference phase or have a known phase offset with respect to one another.

Figure 6:
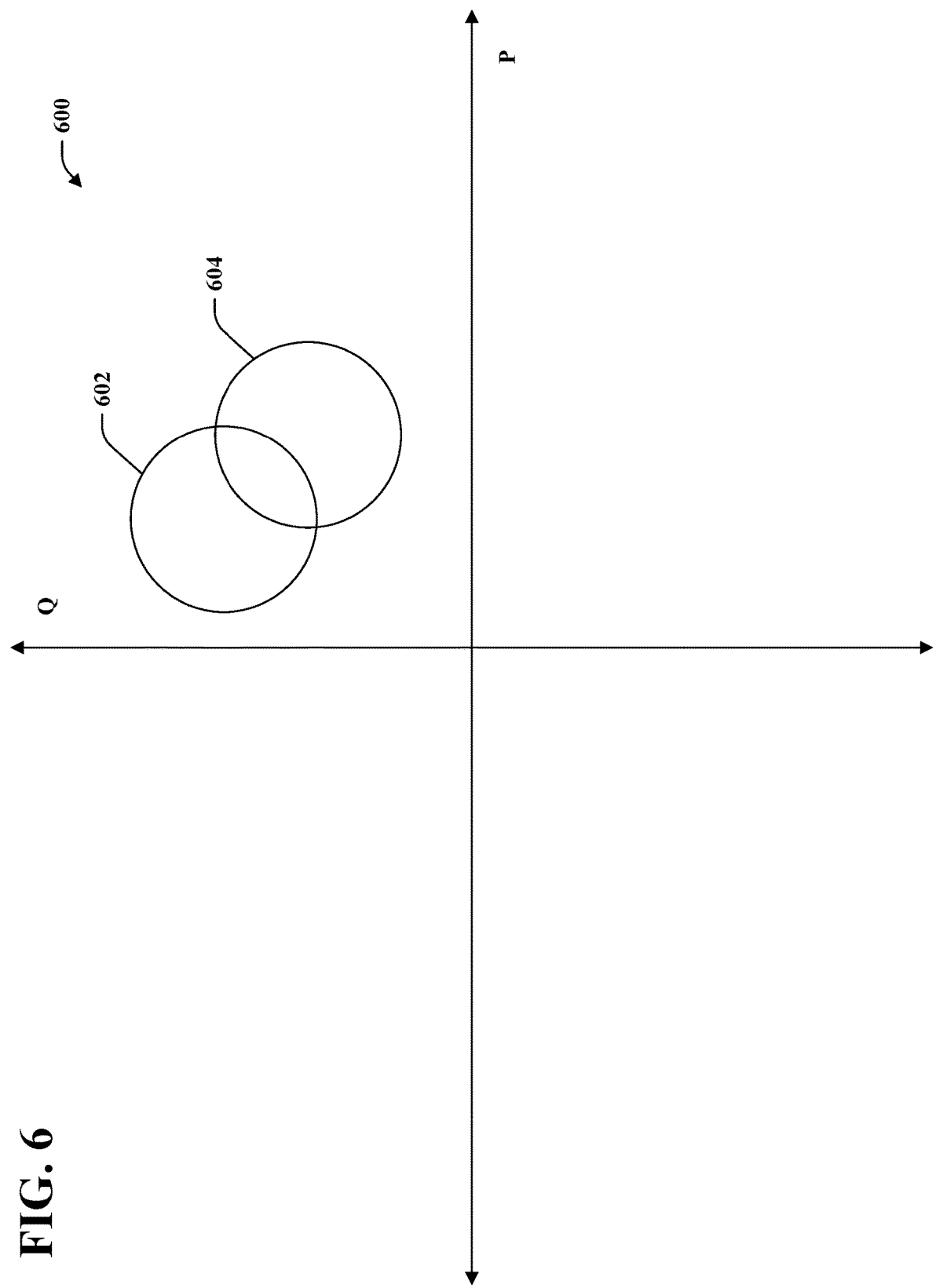
FIG. 6 is a P-Q quadrature diagram of exemplary non-orthogonal coherent states.

The first coherent state and the second coherent state transmitted by the transmitter 502 are non-orthogonal. Stated differently, the first coherent state and the second coherent state can be selected such that the first coherent state and the second coherent state overlap in P-Q quadrature space. By way of example, and referring now to FIG. 6, a diagram 600 of a P-Q quadrature space is illustrated wherein a representation of a first coherent state 602 and a representation of a second coherent state 604 are depicted in the P-Q quadrature space. The P-Q quadrature space represents complex amplitude of coherent states of light having real and imaginary parts. Such coherent states can be equivalently represented in polar coordinates by an amplitude and phase angle. Due to the fundamental limit imposed by shot noise, the coherent states 602, 604 are depicted as circles rather than dimensionless points, wherein the radii of the circles is representative of the measurement uncertainty imposed by shot noise. Stated differently, even where an ideal transmitter transmits a coherent state that is defined by a dimensionless point in the P-Q quadrature space, the coherent state will be measured as any one of a plurality of states having P-Q quadrature values that lie within some circle about the dimensionless point. The measurable coherent states 602, 604 are depicted as being non-orthogonal. Thus, the circles representing the measurable values of the coherent states 602, 604 overlap with one another in P-Q quadrature space. With more particularity, the inner product between the first coherent state 602 and the second coherent state 604 is non-zero.

Referring once again to FIG. 5, the first laser 506 and the second laser 508 output light in first and second coherent states, respectively, that are known to overlap in P-Q quadrature space based upon known measurement uncertainty imposed by shot noise. Thus, there will be at least some values measured by the optical receiver 504 for which it will be uncertain to the receiver 504 (or more precisely, the operator of the receiver 504) which of the first and second coherent state was originally output by the transmitter 502. In some embodiments, it may be desirable to select the coherent states output by the lasers 506, 508 to have a particular degree of overlap in P-Q quadrature space. Stated differently, the coherent states output by the lasers 506, 508 may be selected such that, when the coherent states are measured at the receiver 504, the coherent state value transmitted by the transmitter 502 is completely determined at the receiver 504 according to a first probability and is uncertain according to a second probability. Thus, the coherent states output by the lasers 506, 508 can be selected such that for some desired percent of transmitted states, on average, the receiver 504 is unable to determine which of the first or second coherent state was transmitted by the transmitter.

The optical transmitter 502 can selectively transmit light having either the first coherent state or the second coherent state by selectively energizing the lasers 506, 508 or selectively coupling output of the lasers 506, 508 to the optical channel 126.

The optical receiver 504 receives pulses of light from the optical channel 126 and measures values of the coherent states of the pulses. The optical receiver 504 includes a homodyne detector 512 and a laser 514 that is used as a local oscillator for interferometric measurement by the homodyne detector 512. The optical transmitter 502 and the optical receiver 504 can be jointly calibrated prior to use in an enrollment phase of the system 100 such that the optical transmitter 502 and the optical receiver 504 share a same local oscillator phase. Accordingly, the optical receiver 504 can optionally include a phase shifter 516 that is configured to shift the phase of light output by the local oscillator laser 514 prior to receipt of the light from the laser 514 at the homodyne detector 512. Responsive to receipt of a pulse at the homodyne detector 512, the homodyne detector 512 outputs a signal that is indicative of the coherent state of the pulse to the hardware logic device 112. The hardware logic device 112 can generate a value representative of the coherent state based upon the signal received from the homodyne detector 512. As noted above, due to the non-orthogonal nature of the coherent states output by the laser 506 (in combination with the phase shifter 510) and the laser 508, respectively, in some cases it will be uncertain which coherent state was transmitted by the transmitter 502 based upon the value generated by the hardware logic device 112.

Figure 7:
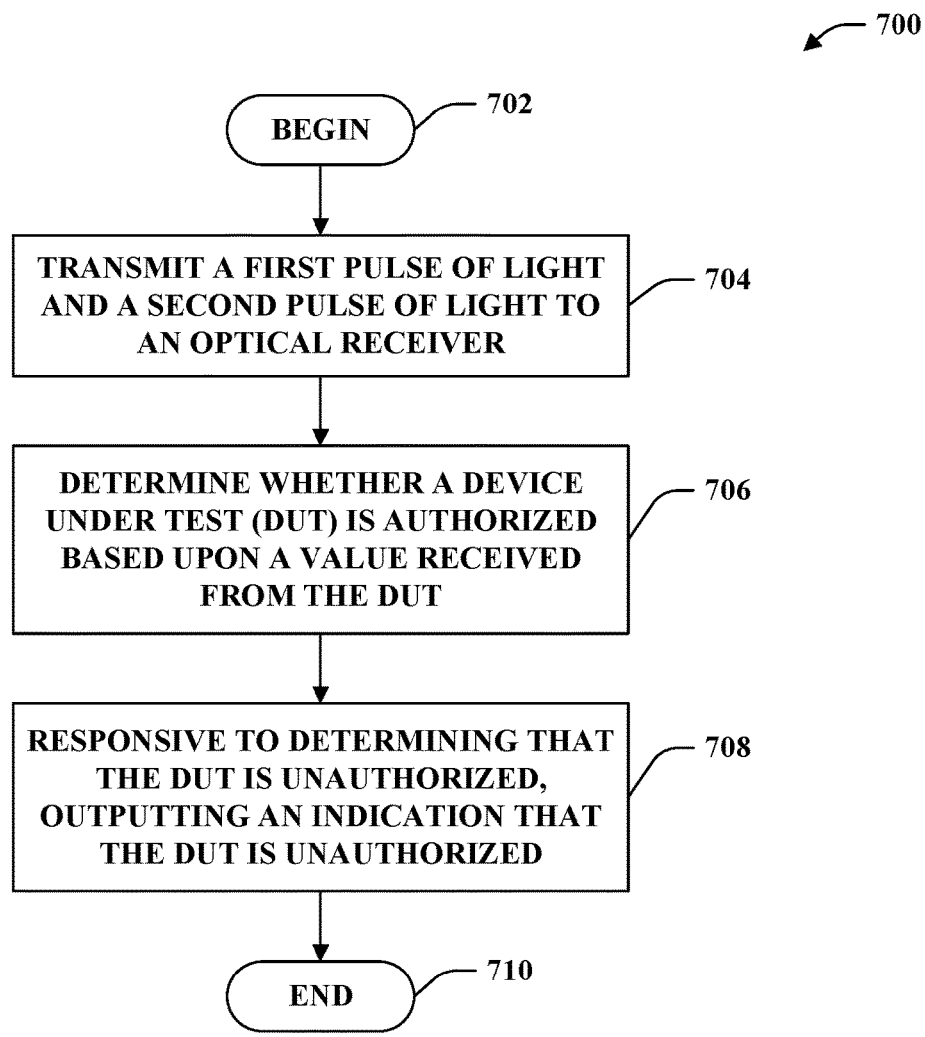
FIG. 7 is a flow diagram that illustrates an exemplary methodology for quantum optical device authentication.

FIG. 7 illustrates an exemplary methodology relating to quantum optical authentication. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors or hardware logic devices and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 7, a methodology 700 that facilitates quantum optical authentication of a first device by a second device is illustrated. The methodology 700 begins at 702, and at 704 a first pulse of light and a second pulse of light are transmitted to an optical receiver, wherein the first pulse of light has a first optical state and the second pulse of light has a second optical state that is non-orthogonal to the first optical state. At 706, responsive to receiving a value from a DUT, it is determined whether the DUT is authorized. The determining of whether the DUT is authorized is based upon the value received from the DUT and one of the first optical state or the second optical state. In an exemplary embodiment, determining whether the DUT is authorized comprises determining whether the value received from the DUT is a quantum mechanically possible measured value of one of the first optical state or the second optical state transmitted at 704. At 708, responsive to determining that the DUT is unauthorized, an indication that the DUT is unauthorized is output (e.g., by a hardware logic device coupled to an optical transmitter that transmitted). At 710 the methodology completes.

Figure 8:
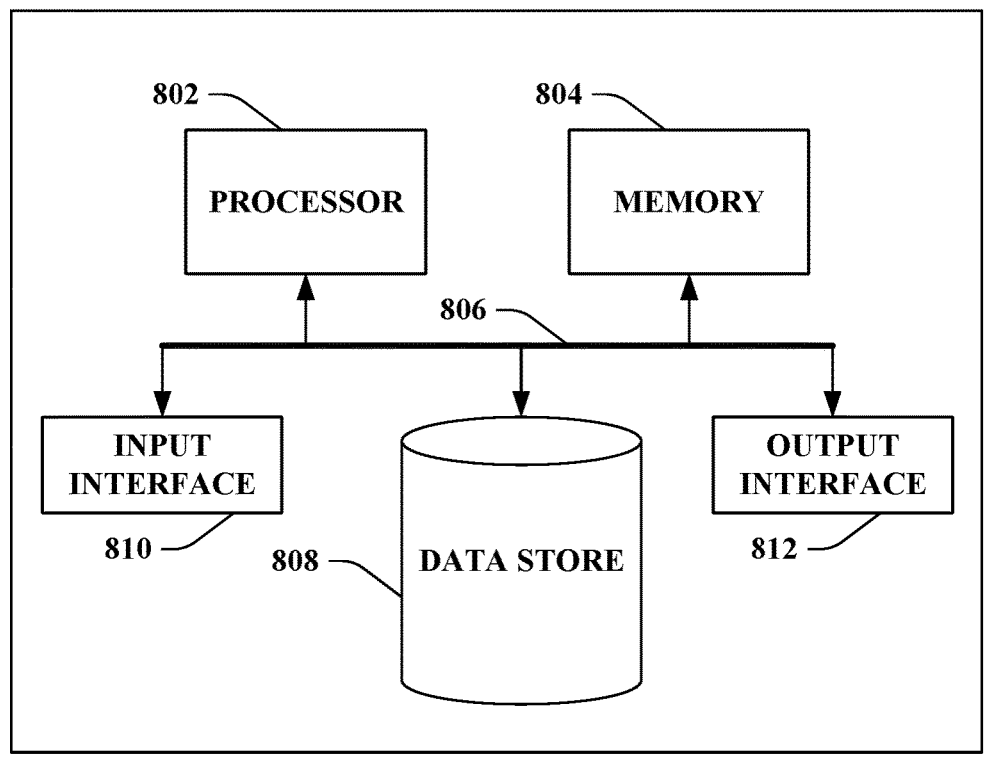
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in a system that controls operations of either of an optical transmitter or an optical receiver of a quantum optical device authentication system. By way of another example, the computing device 800 can be used in connection with authenticating a DUT based upon stored authentication data and authentication data received from the DUT. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store authentication data.

The computing device 800 additionally includes a data store 808 that is accessible by the processor 802 by way of the system bus 806. The data store 808 may include executable instructions, authentication data, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc., by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for quantum device authentication, comprising:
at least one of a computing device or a hardware logic device configured to perform the following acts:
causing an optical transmitter to transmit a first pulse of light and a second pulse of light to an optical receiver, wherein the first pulse of light has a first optical state and the second pulse has a second optical state that is non-orthogonal to the first optical state;
responsive to receiving a value from a device under test (DUT), determining whether the first value is consistent with being a measured value of the first optical state of the first pulse as received by the receiver; and
responsive to determining that the first value is not consistent with being a measured value of the first optical state encoded on the first pulse, outputting an indication that the DUT is unauthorized.

2. The system of claim 1, wherein the optical states are polarization states, the first optical state being a first polarization, the second optical state being a second polarization.

3. The system of claim 2, wherein the first polarization is 45 degrees offset from the second polarization.

4. The system of claim 2, further comprising the optical transmitter, wherein the optical transmitter comprises a laser and a waveplate, the waveplate selectively controlled to impart the first polarization to the first pulse and to impart the second polarization to the second pulse.

5. The system of claim 2, further comprising the optical transmitter, wherein the optical transmitter comprises a first laser and a second laser, the first laser configured to output light having the first polarization, the second laser configured to output light having the second polarization.

6. The system of claim 2, wherein the optical transmitter and the optical receiver share a common reference polarization.

7. The system of claim 1, wherein the first optical state is a first coherent state, and wherein the second optical state is a second coherent state.

8. The system of claim 7, further comprising the optical transmitter, wherein the optical transmitter comprises:
a first laser configured to output light having the first coherent state; and
a second laser configured to output light having the second coherent state.

9. The system of claim 7, wherein the optical transmitter and the optical receiver are configured to have a shared local oscillator phase.

10. The system of claim 7, further comprising the optical receiver, wherein the optical receiver comprises a homodyne detector configured to output data indicative of coherent states of optical pulses received by the optical receiver.

11. The system of claim 7, wherein the first coherent state comprises a first phase quadrature value and a first amplitude quadrature value, and wherein the second coherent state comprises a second phase quadrature value and a second amplitude quadrature value.

12. The system of claim 1, further comprising a number generator, wherein the first pulse is transmitted with the first optical state based upon a first number being output by the number generator, and wherein the second pulse is transmitted with the second optical state based upon a second number being output by the number generator.

13. The system of claim 12, wherein the number generator is a true random number generator.

14. A method, comprising:
transmitting a first pulse of light and a second pulse of light to an optical receiver, wherein the first pulse of light has a first optical state and the second pulse has a second optical state that is non-orthogonal to the first optical state;
responsive to receiving a value from a device under test (DUT), determining whether the DUT is authorized based upon the received value and one of the first optical state or the second optical state; and
responsive to determining that the DUT is unauthorized, outputting an indication that the DUT is unauthorized.

15. The method of claim 14, wherein determining whether the DUT is authorized is based upon the received value and the first optical state, and wherein determining whether the DUT is authorized comprises determining whether the value is an acceptable value corresponding to the first optical state.

16. The method of claim 14, wherein determining whether the DUT is authorized is based upon the received value and the second optical state, and wherein determining whether the DUT is authorized comprises determining whether the value is one of two acceptable values corresponding to the second optical state.

17. The method of claim 14, wherein the first optical state and the second optical state are a first polarization and a second polarization, respectively.

18. The method of claim 14, wherein the first optical state and the second optical state are respective first and second coherent states.

19. A quantum optical authentication system comprising:
an optical receiver that receives a first pulse and a second pulse from an optical transmitter, the first pulse having a first optical state, the second pulse having a second optical state that is non-orthogonal to the first optical state, wherein responsive to receiving the first pulse the optical receiver outputs a first electrical signal and responsive to receiving the second pulse the optical receiver outputs a second electrical signal; and
a hardware logic device configured to perform the following acts:
responsive to receiving the first electrical signal, generating a first value;
responsive to receiving the second electrical signal, generating a second value;
responsive to receiving a third value and a fourth value from a device under test (DUT), comparing the third value to the first value and comparing the fourth value to the second value to determine whether the DUT is authorized; and
when the DUT is determined to be unauthorized, outputting an indication that the DUT is unauthorized.

20. The quantum optical authentication system of claim 19, wherein determining whether the DUT is authorized comprises determining that the first value is a quantum mechanically valid measured value of an optical state having the third value.

* * * * *